(12) United States Patent
Lee

(10) Patent No.: US 12,423,991 B2
(45) Date of Patent: Sep. 23, 2025

(54) APPARATUS FOR RECOGNIZING OBJECT AND METHOD THEREOF

(71) Applicants: Hyundai Motor Company, Seoul (KR); Kia Corporation, Seoul (KR)

(72) Inventor: En Sun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/641,273

(22) Filed: Apr. 19, 2024

(65) Prior Publication Data

US 2025/0078524 A1    Mar. 6, 2025

(30) Foreign Application Priority Data

Sep. 4, 2023   (KR) .......................... 10-2023-0117177

(51) Int. Cl.
*G06V 20/58* (2022.01)
*G01S 17/06* (2006.01)
*G06V 20/56* (2022.01)

(52) U.S. Cl.
CPC .............. *G06V 20/58* (2022.01); *G01S 17/06* (2013.01); *G06V 20/588* (2022.01)

(58) Field of Classification Search
CPC ...... G06V 20/58; G06V 20/588; G01S 17/06; G01S 17/931; G01S 17/894; B60W 30/08; B60W 40/02; B60W 2420/408; B60W 2554/40
USPC ....................................................... 348/148
See application file for complete search history.

(56) References Cited

U.S. PATENT DOCUMENTS

| | | | |
|---|---|---|---|
| 2019/0100200 A1* | 4/2019 | McNew | G06V 20/588 |
| 2019/0103023 A1* | 4/2019 | McNew | G08G 1/0962 |
| 2020/0218913 A1* | 7/2020 | Unnikrishnan | G01S 13/867 |
| 2021/0019534 A1* | 1/2021 | Sakamoto | G06F 18/256 |
| 2022/0066457 A1* | 3/2022 | Kindo | B60W 50/14 |
| 2022/0227367 A1* | 7/2022 | Kario | G06V 40/103 |
| 2022/0281456 A1* | 9/2022 | Giovanardi | G08G 1/0112 |
| 2023/0243970 A1 | 8/2023 | Lee et al. | |
| 2024/0428596 A1* | 12/2024 | Parikh | G06T 7/246 |

FOREIGN PATENT DOCUMENTS

KR    10-2023-0117913 A    8/2023

OTHER PUBLICATIONS

Munajat et al., Vehicle detection and tracking, 2016 2nd ICSITech, Balikpapan, Indonesia, pp. 214-249 (Year: 2016).*

* cited by examiner

*Primary Examiner* — Marnie A Matt
(74) *Attorney, Agent, or Firm* — Banner & Witcoff, Ltd.

(57) ABSTRACT

The present disclosure relates to an object recognition apparatus and method, and the object recognition apparatus includes a sensor and a processor. The processor may determine, based on sensing information of the sensor, longitudinal position information, and lateral position information, determine, lane information determine whether at least one other object, which is different from the object and which is identified as a moving object or a stationary object, is located within the lane in which the object is located, assign a reliability value to the object, wherein a first value corresponds to the reliability value for the object based on the at least one other object being located within the lane in which the object is located, or a second value smaller than the first value as the reliability value, and determine the object as a moving object or a stationary object.

20 Claims, 12 Drawing Sheets

| | FEATURE | | WEIGHT | $\sum$ FEATURE*WEIGHT = SCORE |
|---|---|---|---|---|
| Static Object | OUT-LANE INFORMATION | 211 | WEIGHT$_{S1}$ | IMMOBILITY SCORE 203 |
| | BOX SIZE INFORMATION | 213 | WEIGHT$_{S2}$ | |
| | BOX MATCHING INFORMATION | 215 | WEIGHT$_{S3}$ | |
| | ... | | | |
| Dynamic Object | IN-LANE INFORMATION | 217 | WEIGHT$_{D1}$ | MOBILITY SCORE 205 |
| | TRACKING INFORMATION | 219 | WEIGHT$_{D2}$ | |
| | OTHER IN-LANE-OBJECT INFORMATION | 221 | WEIGHT$_{D3}$ | |
| | SPEED INFORMATION | 223 | WEIGHT$_{D4}$ | |
| | CONTOUR POINT DISTRIBUTION INFORMATION | 225 | WEIGHT$_{D5}$ | |
| | BOUNDARY OBJECT INFORMATION | 227 | WEIGHT$_{D6}$ | |
| | ... | | | |

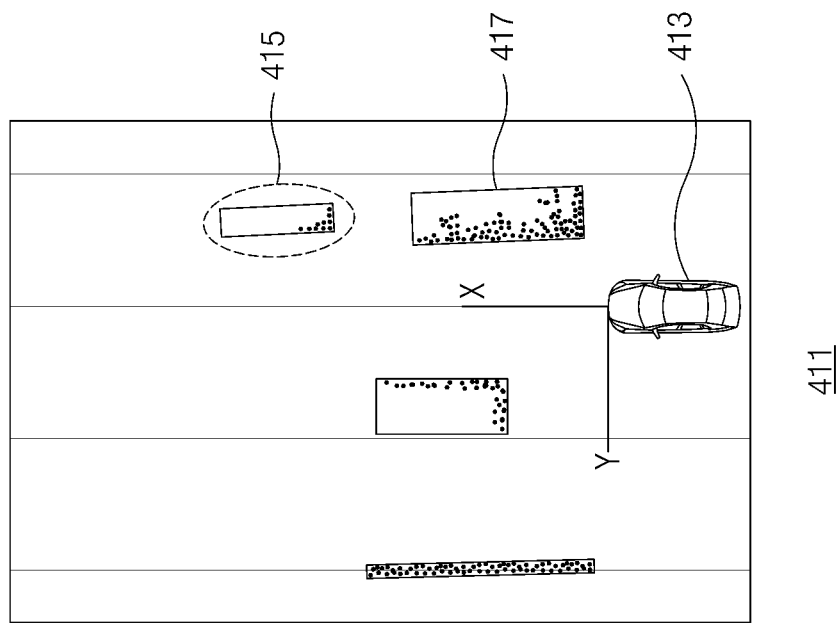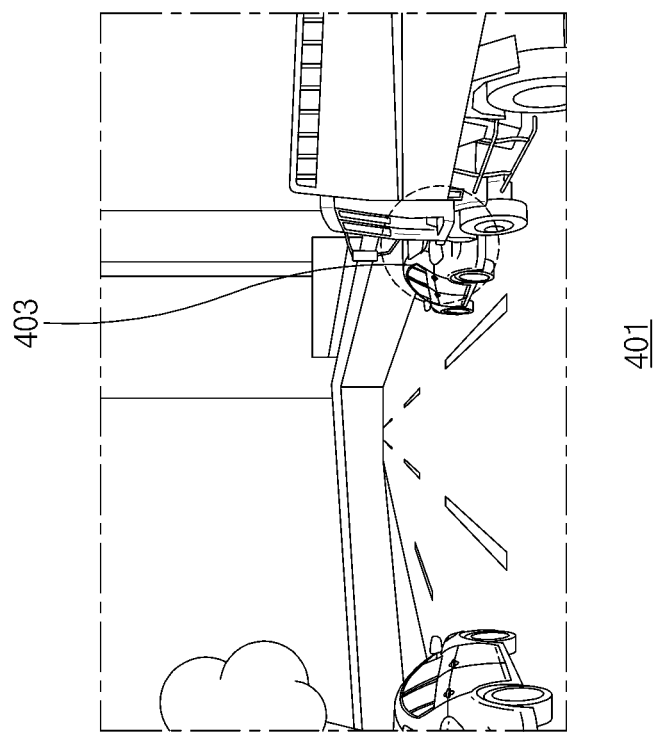
FIG. 4

APPARATUS FOR RECOGNIZING OBJECT AND METHOD THEREOF

CROSS-REFERENCE TO RELATED APPLICATION

This application claims the benefit of priority to Korean Patent Application No. 10-2023-0117177, filed in the Korean Intellectual Property Office on Sep. 4, 2023, the entire contents of which are incorporated herein by reference.

TECHNICAL FIELD

The present disclosure relates to an object recognition apparatus and method, and more particularly, to a technique for identifying characteristics of an object based on a contour point obtained through one or more sensors, such as a light detection and ranging (LIDAR).

BACKGROUND

A technology of detecting surrounding environments and distinguishing between obstacles is required for a vehicle to adjust its course and avoid obstacles without driver intervention A vehicle may obtain data indicating the position of an object around the vehicle through a sensor, such as a LIDAR device (hereinafter, it may be referred to as "LIDAR"). A distance from a LIDAR to an object may be obtained through an interval between the time when laser is transmitted by the LIDAR and the time when the laser reflected by the object is received. A vehicle is able to identify the position of a point included in the object in a space where the vehicle is located, based on the angle of the transmitted laser and the distance to the object.

The autonomous vehicle may process the data acquired by the LIDAR to determine information about surrounding environments and surrounding objects. However, there is a growing need for technologies to efficiently identify information about surrounding environments and surrounding objects from the data acquired through the LIDAR due to the limited amount of memory and time allowed for data processing.

SUMMARY

The following summary presents a simplified summary of certain features. The summary is not an extensive overview and is not intended to identify key or critical elements.

An aspect of the present disclosure provides an object recognition apparatus and method for identifying whether an object is a moving object or a stationary object (e.g., an object that is not currently in a moving state but is capable of being in a moving state, an object incapable of being in a moving state, etc.).

An aspect of the present disclosure provides an object recognition apparatus and method for identifying whether an object having a part obscured or being in a stationary state is a moving object or a stationary object.

An aspect of the present disclosure provides an object recognition apparatus and method for improving the accuracy of determination of identifying whether an object is a moving object or a stationary object.

The technical problems to be solved by the present disclosure are not limited to the aforementioned problems, and any other technical problems not mentioned herein will be clearly understood from the following description by those skilled in the art to which the present disclosure pertains.

An apparatus may comprise: a sensor, and a processor, wherein the processor is configured to: determine, based on sensing information of the sensor, longitudinal position information representing a distance in a line direction from a vehicle to an object and lateral position information representing a distance in a direction perpendicular to the line direction; determine, based on a determination that the longitudinal position information falls within a range according to a threshold distance, lane information representing a lane in which the object is located, wherein the lane information is determined based on at least one of: the lateral position information or positions of lines located on both sides of the vehicle; determine whether at least one other object, which is different from the object and which is identified as a moving object or a stationary object, is located within the lane in which the object is located; assign a reliability value to the object, wherein a first value corresponds to the reliability value for the object based on the at least one other object being located within the lane in which the object is located, or a second value smaller than the first value corresponds to the reliability value for the object based on the at least one other object not being located within the lane in which the object is located; determine, based on the reliability value, the object as a moving object or as a stationary object; and output a signal indicating that the object is a moving object or a signal indicating that the object is a stationary object.

The processor may be configured to: identify curvature information indicating a curvature of a lane in which the vehicle is located, and identify the positions of the lines based on at least one of: the longitudinal position information, the curvature information, a width of a specified lane, or a number of specified lanes.

The processor may be configured to: identify, based on the lateral position information, that the object is located between a position of a first line and a position of a second line that is next to the first line, and wherein the lane information is configured to indicate a lane located between the first line and the second line.

A threshold distance of longitudinal position information identified by the vehicle driving at a first speed may be configured to be smaller than a threshold distance of longitudinal position information identified by the vehicle driving at a second speed faster than the first speed.

A threshold distance of longitudinal position information identified by the vehicle driving on a lane with a first curvature may be configured to be smaller than a threshold distance of longitudinal position information identified by the vehicle driving on a lane with a second curvature greater than a first curvature.

The processor may be configured to: determine curvature information indicating a curvature of a lane in which the vehicle is located; and determine the longitudinal position information and the lateral position information based on the curvature information being greater than a specified curvature value.

A third value corresponds to the reliability value for the object when a first number of other objects identified as moving objects or objects capable of being in a moving state are identified within the lane in which the object is located; and a fourth value greater than the third value corresponds to the reliability value for the object when a second number of other objects greater than the first number are identified within the lane in which the object is located.

The processor may be configured to: change the reliability value from the second value to the first value based on the lane information of the object being changed due to the object moving from a first lane in which an other object is not located to a second lane in which the other object is located.

The processor may be configured to: maintain the reliability value even when at least one other object moves into the lane in which the object is located before the object is identified as a moving object or before the object is identified as a stationary object.

The processor may be configured to: assign, to the object, an identifier indicating that the object is a moving object or a stationary object capable of being in a moving state, based on a determination that a score value representing a probability that the object identified based on the reliability value is a moving object or a stationary object capable of being in a moving state is greater than a score value representing a probability that the object is a stationary object incapable of being in a moving state.

A method may comprise: determining, by a processor and based on sensing information of a sensor, longitudinal position information representing a distance in a line direction from a vehicle to an object and lateral position information representing a distance in a direction perpendicular to the line direction; determining, based on a determination that the longitudinal position information falls within a range according to a threshold distance, lane information representing a lane in which the object is located, wherein the lane information is determined based on at least one of: the lateral position information or positions of lines located on both sides of the vehicle; determining whether at least one other object, which is different from the object and which is identified as a moving object or a stationary object, is located within the lane in which the object is located; assigning a reliability value to the object, wherein a first value corresponds to the reliability value for the object based on the at least one other object being located within the lane in which the object is located, or a second value smaller than the first value corresponds to the reliability value for the object based on the at least one other object not being located within the lane in which the object is located; determining, based on the reliability value, the object as a moving object or as a stationary object; and outputting a signal indicating that the object is a moving object or a signal indicating that the object is a stationary object.

The method may further comprise one or more operations and features described herein.

These and other features and advantages are described in greater detail below. The features briefly summarized above with respect to the present disclosure are merely exemplary aspects of the detailed description of the present disclosure described below and do not limit the scope of the present disclosure.

BRIEF DESCRIPTION OF THE DRAWINGS

The above and other objects, features and advantages of the present disclosure will be more apparent from the following detailed description taken in conjunction with the accompanying drawings:

FIG. 2 is a table showing information required to identify whether an object is a moving object, an object capable of being in a moving state, or an object incapable of being in a moving state in an object recognition apparatus or an object recognition method;

FIG. 4 shows an example of identifying a reliability according to information, which is performed on a partially occluded object in an object recognition apparatus or an object recognition method;

DETAILED DESCRIPTION

Figure 1:
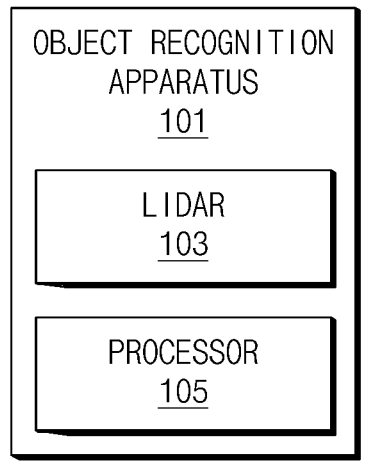
FIG. 1 is a block diagram showing an object recognition apparatus.

Hereinafter, various examples of the present disclosure will be described in detail with reference to the exemplary drawings. In adding the reference numerals to the components of each drawing, it should be noted that the identical or equivalent component is designated by the identical numeral even when they are displayed on other drawings. Further, in describing various features of the present disclosure, a detailed description of well-known features or functions may be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Further, the terms "unit", "device", "member", "body", or the like used hereinafter may indicate at least one shape structure or may indicate a unit for processing a function.

In addition, in the present disclosure, the expressions "greater than" or "less than" may be used to indicate whether a specific condition is satisfied or fulfilled, but are used only to indicate examples, and do not exclude "greater than or equal to" or "less than or equal to". A condition indicating "greater than or equal to" may be replaced with "greater than", a condition indicating "less than or equal to" may be replaced with "less than", a condition indicating "greater than or equal to and less than" may be replaced with "greater than and less than or equal to". In addition, 'A' to 'B' means at least one of elements from A (including A) to B (including B).

Hereinafter, examples of the present disclosure will be described in detail with reference to FIGS. 1 to 12.

FIG. 1 is a block diagram showing an object recognition apparatus.

Referring to FIG. 1, an object recognition apparatus 101 may be implemented inside (or outside) a vehicle. In this case, the object recognizing apparatus 101 may be integrally formed with internal control units of the vehicle, or may be implemented as a separate device and connected to the control units of the vehicle by separate connection means.

Referring to FIG. 1, the object recognition apparatus 101 may include a sensor (e.g., a LIDAR 103) and a processor 105.

The processor 105 of the object recognition apparatus 101 may obtain position information of points of an object around a vehicle (e.g., a vehicle including the object recognition apparatus 101) through the LIDAR 103. The processor 105 of the object recognition apparatus 101 may acquire a plurality of points (e.g., a point cloud) representing the object through the LIDAR 103. The processor 105 of the object recognition apparatus 101 may identify contour points among points included in the plurality of points (e.g., a point cloud).

The processor 105 of the object recognition apparatus 101 may identify position information of a point corresponding to an object based on contour points representing the object. For example, the point corresponding to the object may include a center point of the rearmost line segment in the moving direction of the object among line segments constituting an object box including contour points representing the object. The center point may be referred to as a tracking point, but may not be limited thereto.

The processor 105 of the object recognition apparatus 101 may identify longitudinal position information indicating a distance from the host vehicle to an object in the line direction. The processor 105 of the object recognition apparatus 101 may identify lateral position information indicating a distance from the host vehicle to the object in a direction perpendicular to the line direction.

The processor 105 of the object recognition apparatus 101 may identify curvature information indicating the curvature of a lane based on a speed of the host vehicle and a yaw angular velocity of the host vehicle.

The processor 105 of the object recognition apparatus 101 may identify a threshold distance based on the curvature information. The threshold distance may refer to a distance including an object capable of guaranteeing accuracy of a specific value or more for an object recognition method. The processor 105 of the object recognition apparatus 101 may identify the threshold distance based on at least one of the curvature information, or the speed information of the host vehicle, or any combination thereof.

The processor 105 of the object recognition apparatus 101 may identify whether the longitudinal position information of the object falls within a range according to the threshold distance. If the longitudinal position information of the object falls within the range according to the threshold distance, the object recognition apparatus 101 may determine whether the object is a moving object or a stationary object of a first type (e.g., an object capable of being in a moving state). The moving object or the stationary object of a first type may include vehicles (e.g., two-wheeled vehicles, four-wheeled vehicles). A stationary object of a second type (e.g., an object incapable of being in a moving state) may include structures (e.g., traffic signs, guardrails).

The processor 105 of the object recognition apparatus 101 may identify the positions of lines located on both sides of the host vehicle based on at least one of the curvature information, the longitudinal position information of the object, the width of a specified lane (e.g., about 3.5 m or about 3.7 m), or the number of specified lanes (e.g., 7) or any combination thereof. The identifying of positions of lines will be described below with reference to FIG. 7.

The processor 105 of the object recognition apparatus 101 may identify the longitudinal position information of the object and lane information indicating a lane in which the object is located according to the positions of the lines. The identifying of the lane information will be described below with reference to FIG. 7.

The processor 105 of the object recognition apparatus 101 may identify that at least one other object is located within the lane in which the object is located, based on the lane information. If at least two other objects are identified as moving objects or objects capable of being in a moving state, the processor 105 of the object recognition apparatus 101 may assign a first value (e.g., 1) as a reliability value according to other in-lane object information of the object.

If another object is identified as a moving object or an object capable of being in a moving state, the processor 105 of the object recognition apparatus 101 may assign a second value (e.g., 0.8) as a reliability value according to other in-lane object information of the object.

If it is determined based on lane information that at least one other object is not located in the lane in which the object is located, the processor 105 of the object recognition apparatus 101 may assign a third value (e.g., 0) smaller than the first value as a reliability value according to other in-lane object information of the object.

The processor 105 of the object recognition apparatus 101 may calculate a score value indicating a probability that the object is a moving object or an object capable of being in a moving state based on the reliability value of the object. The reliability value may be identified based on the other in-lane object information. The other in-lane object information may be referred to as a dynamic object on lane variable, but aspects of the present disclosure may not be limited thereto. The identifying of the score value based on the reliability value according to the information of the object will be described below with reference to FIG. 2.

The processor 105 of the object recognition apparatus 101 may identify that an object is a moving object or an object capable of being in a moving state, based on the score value indicating the probability that an object is a moving object or an object that is able to be in a moving state being greater than the score value indicating the probability that an object is an object incapable of being in a moving state.

The processor 105 of the object recognition apparatus 101 may assign, to the object, an identifier indicating that the object is a moving object or an object capable of being in a moving state based on identifying that the object is a moving object or an object capable of being in a moving state. The identifier may be referred to as a flag, but may not be limited thereto.

FIG. 2 is a table showing information required to identify whether an object is a moving object, an object capable of being in a moving state, or an object incapable of being in a moving state in an object recognition apparatus or an object recognition method.

Referring to FIG. 2, table 201 may represent types of information for calculating a score for identifying whether an object is a moving object or an object that is able to be in a moving state. An immobility score 203 may represent a score for identifying whether an object is an object that is unable to be in a moving state. The immobility score 203 may be identified based on information such as out-lane information 211, box size information 213, and box matching information 215. A mobility score 205 may represent a score for identifying whether an object is a moving object or an object that is able to be in a moving state. The mobility score 205 may be identified based on information such as in-lane information 217, tracking information 219, other in-lane-object information 221, speed information 223, contour point distribution information 225, and boundary object information 227.

The out-lane information 211 for identifying the immobility score 203 may represent a reliability assigned based on whether an object is identified outside a lane. The box size information 213 for identifying the immobility score 203 may represent a reliability assigned based on whether the size of an object box is greater than or equal to a reference size. The box matching information 215 for identifying the immobility score 203 may a reliability assigned based on the distribution of contour points and the degree of match of the object box.

The in-lane information 217 may represent a reliability assigned based on whether an object is identified inside a lane. The tracking information 219 may represent a reliability assigned based on whether an object is moving. The speed information 223 may represent a reliability assigned based on the speed of an object. The boundary object information 227 may represent a reliability assigned based on whether an object is identified without being occluded at the boundary of a field of view.

The immobility score 203 may be identified by the sum of values obtained by multiplying reliabilities (e.g., reliability values or scores) represented by pieces of information by a weight. For example, the immobility score 203 may be identified by the sum of a value obtained by multiplying the reliability value according to the out-lane information 211 by a weight (e.g., $weight_{S1}$) corresponding to the out-lane information 211, a value obtained by multiplying the reliability value according to the box size information 213 by a weight (e.g., $weight_{S2}$) corresponding to the box size information 213, a value obtained by multiplying the reliability value according to the box matching information 215 by a weight (e.g., $weight_{S3}$) corresponding to the box matching information 215, or at least one of any combination thereof. However, aspects of the present disclosure may not be limited thereto. According to an example, the immobility score 203 may be identified by adding up not only a value obtained by multiplying a value (e.g., a score) corresponding to a respective piece of information listed in the table 201 by a weight, but also a value obtained by multiplying a value (e.g., a score) corresponding to a piece of information not listed in the table 201 by the weight.

The mobility score 205 may be identified by the sum of values obtained by multiplying the reliability values (or scores) represented by pieces of information indicating reliabilities by a weight. For example, the mobility score 205 may be identified by the sum of at least one of a value obtained by multiplying the reliability value according to the in-lane information 217 by a weight (e.g., $weight_{D1}$) corresponding to the in-lane information 217, a value obtained by multiplying the reliability value according to the tracking information 219 by a weight (e.g., $weight_{D2}$) corresponding to the tracking information 219, a value obtained by multiplying the reliability value according to the other in-lane-object information 221 by a weight (e.g., $weight_{D3}$) corresponding to the other in-lane-object information 221, a value obtained by multiplying the reliability value according to the speed information 223 by a weight (e.g., $weight_{D4}$) corresponding to the speed information 223, a value obtained by multiplying the reliability value according to the contour point distribution information 225 by a weight (e.g., $weight_{D5}$) corresponding to the contour point distribution information 225, a value obtained by multiplying the reliability value according to the boundary object information 227 by a weight (e.g., $weight_{D6}$) corresponding to the boundary object information 227, or any combination thereof. However, aspects of the present disclosure may not be limited thereto. The mobility score 205 may be identified by adding up not only a value obtained by multiplying a value (or a score) corresponding to a piece of information listed in the table 201 by a weight, but also a value obtained by multiplying a value (or a score) corresponding to a piece of information not listed in the table 201 by the weight.

If the mobility score 205 for a certain object is higher than the immobility score 203 for the certain object, the processor of the object recognition apparatus may identify that the certain object is a moving object or an object that is able to be in a moving state. If the immobility score 203 for a certain object is higher than the mobility score 205 for the certain object, the processor of the object recognition apparatus may identify that the certain object is an object that is unable to be in a moving state.

According to the present disclosure, an apparatus (e.g., the object recognition apparatus 101) may identify the reliability value represented by the other in-lane-object information 221. A method for identifying a reliability value represented by the other in-lane-object information 221, according to an example, will be described below with reference to FIG. 5.

Figure 3:
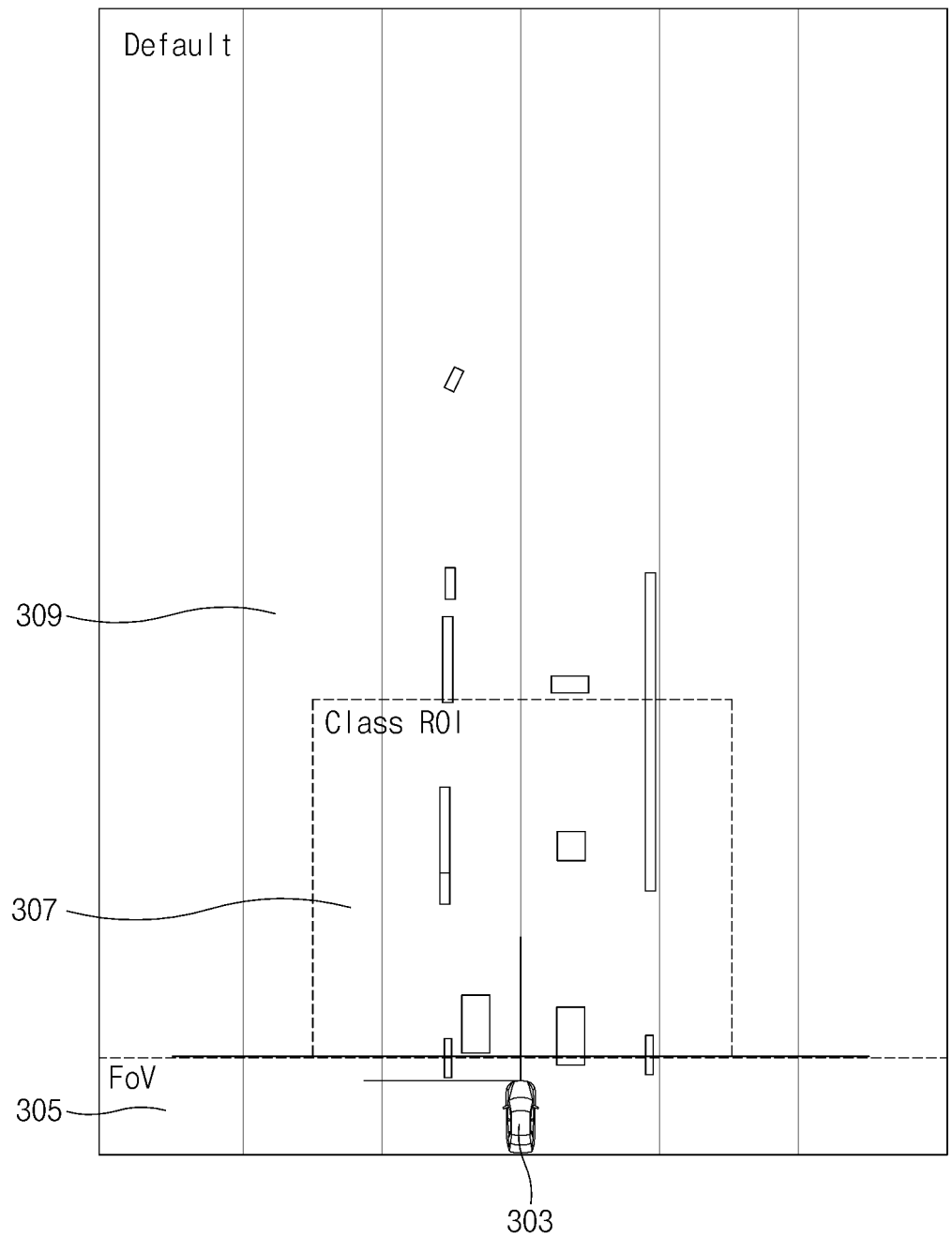
FIG. 3 shows an area in which the weights of reliability values vary according to information in an object recognition apparatus or an object recognition method.

FIG. 3 shows an area in which the weights of reliability values vary according to information in an object recognition apparatus or an object recognition method.

Referring to FIG. 3, a frame 301 may represent a first area 305, a second area 307, and a third area 309 separated according to a distance from a host vehicle 303 (e.g., a vehicle including the object recognition apparatus). The first area 305 may include an area within a field of view. The second area 307 may include an area for classifying objects of interest. The third area 309 may include areas other than the first area and the second area.

The first area 305 may be referred to as a field of view (FOV) area, but may not be limited thereto. The second area 307 may be referred to as a class region of interest (class ROI), but may not be limited thereto. The third area may be referred to as a default area, but may not be limited thereto.

The processor of the object recognition apparatus may assign different weights (e.g., weights in FIG. 2) for identifying an immobility score or a mobility score according to a region in which an object is included. This is because information of high importance may be different depending on the position of an object. For example, the processor of the object recognition apparatus may set a weight of the contour point distribution information 225 to a value greater than 0 only in the second area 307. For example, the processor of the object recognition apparatus may set the weight of the boundary object information 227 in the first area 305 higher than the weight of the boundary object information 227 in the second area 307 and the weight of the boundary object information 227 in the third area 309.

FIG. 4 shows an example of identifying a reliability value according to information, which is performed on a partially occluded object in an object recognition apparatus or an object recognition method.

Referring to FIG. 4, as in screen 401, a first object 403 may be partially obstructed (e.g., occluded in a field of view) by another object. The processor of the object recognition apparatus of a host vehicle 413 may acquire a frame 411 including contour points obtained through a LIDAR. The frame 411 may include a first object 415 and a second object 417.

The processor of the object recognition apparatus may need to identify whether a partially occluded object, such as the first object 403 on the screen 401, is a moving object, an object capable of being in a moving state, or an object incapable of being in a moving state. This is because it is possible to determine the movement of the host vehicle only after it is identified that the first object 403 on the screen 401 is an object incapable of being in a moving state.

However, an existing object recognition apparatus may have difficulty in identifying whether the partially occluded object 403 is a moving object, an object capable of being in a moving state, or an object incapable of being in a moving state. This is because the shape of the object is not fully identified.

The processor of the object recognition apparatus may use a reliability value contained in the other in-lane-object information to identify whether the partially occluded object 403 is a moving object, an object capable of being in a moving state, or an object incapable of being in a moving state.

The processor of the object recognition apparatus may identify in the frame 411 that the second object 417 of the frame 411 is covering the first object 415 of the frame 411. When the second object 417 of the frame 411 in the same lane as the first object 415 of the frame 411 is a moving object or an object capable of being in a moving state, the processor of the object recognition apparatus may assign a reliability value according to other in-lane-object information to the first object 415 of the frame 411 even though a part of the first object 415 of the frame 411 is occluded. The processor of the object recognition apparatus may identify whether the first object 415 of the frame 411 is a moving object or an object capable of being in a moving state based on the reliability value.

The reason for this is that a probability that the specific object is a moving object or an object capable of being in a moving state when another object located in the same lane as the lane of a specific object is a moving object or an object capable of being in a moving state is higher than a probability that the specific object is a moving object or an object capable of being in a moving state when a moving object or an object capable of being in a moving state does not exist in the same lane as the lane of the specific object.

Accordingly, one or more features of the present disclosure may be effective and useful in identifying whether a partially occluded object is a moving object or an object capable of being in a moving state.

Further, one or more features of the present disclosure may be effective and useful in identifying whether an object in a stationary state (e.g., a preceding vehicle at rest, a traffic sign) is an object that can be in a moving state (e.g., a vehicle).

The processor of the object recognition apparatus may identify in the frame 411 that the first object 415 of the frame 411 is in a stationary state. The processor of the object recognition apparatus may assign a reliability value according to other in-lane-object information to the first object 415 of the frame 411 when the second object 417 of the frame 411 which is located in the same lane of the first object 415 of the frame 411 is a moving object or an object capable of being in a moving state, although the first object 415 of the frame 411 is in a stationary state. The processor of the object recognition apparatus may identify whether the first object 415 of the frame 411 is an object capable of being in a moving state based on the reliability value.

Hereinafter, a method for identifying whether an object is a moving object or an object capable of being in a moving state by assigning a reliability value according to other in-lane-object will be described with reference to FIGS. 5 to 7.

Figure 5:
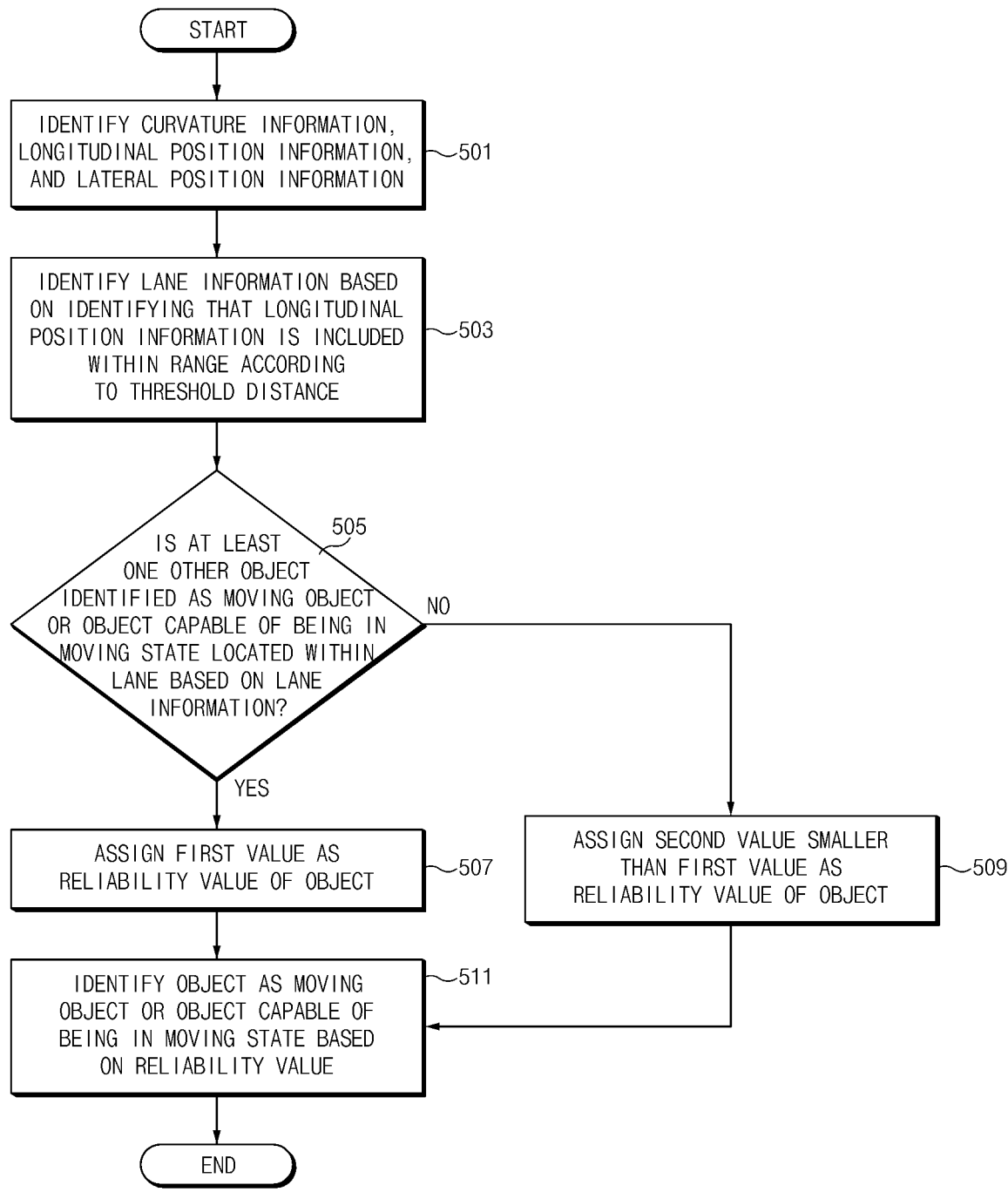
FIG. 5 shows a flowchart of operation of an object recognition apparatus for classifying objects based on reliability according to information in the object recognition apparatus or an object recognition method.

FIG. 5 shows a flowchart of operation of an object recognition apparatus for classifying objects based on reliability value according to information in the object recognition apparatus or an object recognition method.

Hereinafter, it is assumed that the object recognition apparatus 101 of FIG. 1 performs the process of FIG. 5. Additionally, in the description of FIG. 5, operations described as being performed by the apparatus may be understood as being controlled by the processor 105 of the object recognition apparatus 101, but aspects are not limited as such.

Referring to FIG. 5, in a first operation 501, the processor of an object recognition apparatus may identify curvature information, longitudinal position information, and lateral position information. The curvature information may indicate the curvature of a lane in which a host vehicle is located. The longitudinal position information may indicate a distance from the host vehicle to an object in a line direction. The lateral position information may indicate a distance from the host vehicle to an object in a direction perpendicular to the line direction.

The curvature information may be identified based on the yaw angular velocity and speed of the host vehicle which includes the object recognition apparatus. The curvature information may be identified based on the radius of a curvature.

The processor of the object recognition apparatus may identify the longitudinal position information and the lateral position information based on identifying that the curvature information is greater than a specified curvature value (e.g., about 200 m). This is because when the curvature information is less than or equal to the specified curvature value, the accuracy of lane information may be lowered. A situation in which the curvature information is less than or equal to the specified curvature value may include a situation in which the host vehicle rotates (e.g., makes a U-turn).

In a second operation 503, the processor of the object recognition apparatus may identify lane information based on identifying that the longitudinal position information is included within a range according to a threshold distance. The threshold distance may refer to a distance including an object capable of guaranteeing accuracy of a specific value or more for an object recognition method. The lane information may indicate a lane in which an object is located.

The processor of the object recognition apparatus may identify the threshold distance based on at least one of the curvature information, or the speed of the host vehicle, or any combination thereof.

For example, as the curvature of the lane in which the host vehicle is located increases, the threshold distance may decrease. The reason for this is that, when the curvature of the lane is large, the error in lane information for identifying whether another object that is a moving object or an object capable of being in a moving state is located within the lane may increase.

For example, as the speed of the host vehicle decreases, the threshold distance may decrease. This is because the need to identify whether the distant objects are moving objects or objects capable of being in a moving state when the speed of the host vehicle is low may be less than the need to identify whether the distant objects are moving objects or objects capable of being in a moving state when the speed of the host vehicle is high.

The processor of the object recognition apparatus may identify the positions of lines based on at least one of curvature information, the width of a specified lane, or the number of specified lanes, or any combination thereof. In this case, the processor of the object recognition apparatus may identify the lateral positions of lines in a longitudinal position where an object is located, according to the longitudinal position information of the object. The processor of the object recognition apparatus may identify lane information about a lane in which an object is located by comparing the lateral positions of the lines and the lateral position of the object.

The lane information may be identified based on at least one of the lateral position information of the object, or the positions of lines located on both sides of the host vehicle, or any combination thereof. For example, when the lateral position information of an object is identified between the position of a first line and the position of a second line, which is the next line after the first line, the processor of the object recognition apparatus may identify that the object is located in a lane between the first lane and the second lane.

In a third operation 505, the processor of the object recognition apparatus may identify, based on the lane information, whether at least one other object identified as a moving object or an object capable of being in a moving state is located within the lane. If at least one other object identified as a moving object or an object capable of being in a moving state is located within the lane, the processor of the object recognition apparatus may perform a fourth operation 507. If at least one other object identified as a moving object or an object capable of being in a moving state is not located within the lane, the processor of the object recognition apparatus may perform a fifth operation 509.

At least one other object identified as a moving object or an object capable of being in a moving state may be located within the lane in which the object is located. A probability that an object is a moving object or an object capable of being in a moving state when a moving object or an object capable of being in a moving state is located in the same lane as the lane in which the object is located is higher than a probability that the specific object is a moving object or an object capable of being in a moving state when a moving object or an object capable of being in a moving state is not located in the same lane as the lane in which the object is located.

In the fourth operation 507, the processor of the object recognition apparatus may assign a first value as the reliability value of the object.

If another object that is a moving object or an object capable of being in a moving state is located in the same lane as the object, the first value may include 0.8.

If two or more other objects that are moving objects or objects capable of being in a moving state are located in the same lane as the object, the first value may include 1.

The more other objects are identified within the lane in which the object is located, the higher the reliability value of the object may be assigned. For example, the processor of the object recognition apparatus may assign a third value as a reliability value when a first number of other objects, identified as moving objects or objects capable of being in a moving state, are identified in the lane in which the object is located, and assign a fourth value greater than the third value as a reliability value when a second number of other objects are identified within the lane in which the object is located, the second number being greater than the first number.

In the fifth operation 509, the processor of the object recognition apparatus may assign a second value smaller than the first value as the reliability value of the object. For example, the second value may include 0.

In a sixth operation 511, the processor of the object recognition apparatus may identify the object as a moving object or an object capable of being in a moving state based on the reliability value.

As shown in FIG. 2, the processor of the object recognition apparatus may identify a score value indicating a probability that an object is a moving object or an object capable of being in a moving state based on the reliability value. The processor of the object recognition apparatus may identify that a specific object is a moving object or an object capable of being in a moving state, based on a score value indicating the probability that the specific object is a moving object or an object capable of being in a moving state being greater than a score value indicating the probability that the specific object is an object incapable of being in a moving state.

The processor of the object recognition apparatus may assign, to the specific object, an identifier indicating that the specific object is a moving object or an object capable of being in a moving state, based on the specific object being identified as a moving object or an object capable of being in a moving state.

Figure 6:
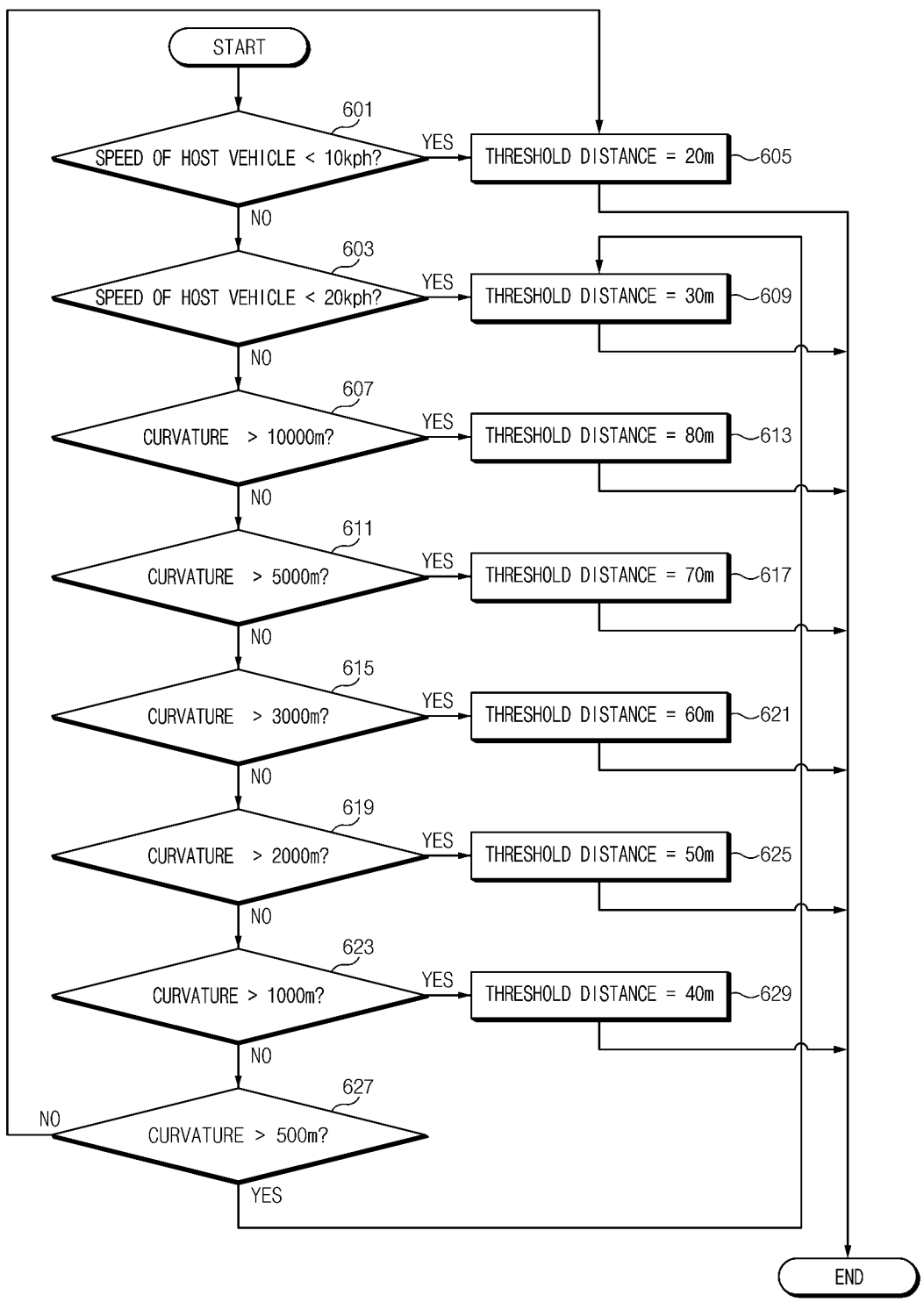
FIG. 6 shows a flowchart of operation of an object recognition apparatus for identifying a threshold distance in the object recognition apparatus or an object recognition method.

FIG. 6 shows a flowchart of operation of an object recognition apparatus for identifying a threshold distance in the object recognition apparatus or an object recognition method.

Hereinafter, it is assumed that the object recognition apparatus 101 of FIG. 1 performs the process of FIG. 6. Additionally, in the description of FIG. 6, operations described as being performed by the apparatus may be understood as being controlled by the processor 105 of the object recognition apparatus 101.

One or more features of the present disclosure may be applied to objects whose longitudinal position information is within a threshold distance. An operation of identifying the threshold distance will be described below.

Referring to FIG. 6, in a first operation 601, the processor of the object recognition apparatus may identify whether the speed of a host vehicle is less than about 10 kph. If the speed of the host vehicle is less than about 10 kph, the processor of the object recognition apparatus may perform a second operation 605. If the speed of the host vehicle is greater than or equal to about 10 kph, the processor of the object recognition apparatus may perform a third operation 603.

The threshold distance may be identified according to the speed of the host vehicle and the curvature of a lane in which the host vehicle is located. The threshold distance when the speed of the host vehicle is less than a first reference speed value (e.g., about 10 kph) may be smaller than the threshold distance when the speed of the host vehicle is greater than or equal to the first reference speed value. In other words, the threshold distance of the longitudinal position information identified by the host vehicle driving at a first speed (e.g., a speed of less than about 10 kph) may be smaller than the threshold distance of the longitudinal position information identified by the host vehicle driving at a second speed (e.g., a speed of about 10 kph or more) faster than the first speed. This is because the need to identify whether the distant objects are moving objects or objects capable of being in a moving state when the speed of the host vehicle is less than the first reference speed value may be less than the need to identify whether the distant objects are moving objects or objects capable of being in a moving state when the speed of the host vehicle is greater than or equal to the first reference speed value.

In the second operation 605, the processor of the object recognition apparatus may set the threshold distance to about 20 m.

In the third operation 603, the processor of the object recognition apparatus may identify whether the speed of the host vehicle is less than about 20 kph. If the speed of the host vehicle is less than about 20 kph, the processor of the object recognition apparatus may perform a fourth operation 609. If the speed of the host vehicle is greater than or equal to about 20 kph, the processor of the object recognition apparatus may perform a fifth operation 607. The processor of the object recognition apparatus may identify whether the speed of the host vehicle is greater than or equal to the first reference speed value (e.g., about 10 kph) and less than a second reference speed value (e.g., about 20 kph).

In the fourth operation 609, the processor of the object recognition apparatus may set the threshold distance to about 30 m. Because the speed of the host vehicle when the fourth operation 609 is performed is greater than the speed of the host vehicle when the second operation 605 is performed, the threshold distance in the fourth operation 609 may be greater than the threshold distance in the second operation 605.

In the fifth operation 607, the processor of the object recognition apparatus may identify whether a curvature is greater than about 10000 m. When the curvature is greater than about 10000 m, the processor of the object recognition apparatus may perform a sixth operation 613. When the curvature is less than or equal to about 10000 m, the processor of the object recognition apparatus may perform a seventh operation 611.

The threshold distance when the curvature of a lane in which the host vehicle is located is less than or equal to a first reference curvature value (e.g., about 10000 m) may be less than the threshold distance when the curvature of the lane is greater than the first reference curvature value. In other words, the threshold distance of the longitudinal position information identified by the host vehicle driving in a lane with a first curvature (e.g., a curvature of about 10,000 m or less) may be smaller than the threshold distance of longitudinal position information identified by the host vehicle driving in a lane with a second curvature (e.g., a curvature of greater than about 10,000 m) that is greater than the first curvature. This is because the accuracy of identification of whether a distant object is in the same lane as another object when the curvature of the lane is greater than the first reference curvature value may be greater than the accuracy of the identification when the curvature of the lane is less than the first reference curvature value.

In the sixth operation 613, the processor of the object recognition apparatus may set the threshold distance to about 80 m.

The threshold distance when the curvature of a lane in which the host vehicle is located is greater than a first reference curvature value (e.g., about 10000 m) may be greater than the threshold distance when the curvature of the lane is less than or equal to the first reference curvature value.

In the seventh operation 611, the processor of the object recognition apparatus may identify whether the curvature is greater than about 5000 m. If the curvature is greater than about 5000 m, the processor of the object recognition apparatus may perform an eighth operation 617. If the curvature is less than or equal to about 5000 m, the processor of the object recognition apparatus may perform a ninth operation 615.

The processor of the object recognition apparatus may identify whether the curvature of a lane is less than or equal to the first reference curvature value (e.g., about 10,000 m) and greater than a second reference curvature value (e.g., about 5,000 m).

In the eighth operation 617, the processor of the object recognition apparatus may set the threshold distance to about 70 m.

The threshold distance when the curvature of a lane in which the host vehicle is located is less than or equal to the first reference curvature value (e.g., about 10000 m) and greater than the second reference curvature value (e.g., about 5000 m) may be greater than the threshold distance when the curvature of the lane is less than or equal to the second reference curvature value (e.g., about 5000 m).

In the ninth operation 615, the processor of the object recognition apparatus may identify whether the curvature is greater than about 3000 m. If the curvature is greater than about 3000 m, the processor of the object recognition apparatus may perform a tenth operation 621. If the curvature is less than or equal to about 3000 m, the processor of the object recognition apparatus may perform an eleventh operation 619.

The processor of the object recognition apparatus may identify whether the curvature of a lane is less than or equal to the second reference curvature value (e.g., about 5000 m) and greater than a third reference curvature value (e.g., about 3000 m).

In the tenth operation 621, the processor of the object recognition apparatus may set the threshold distance to about 60 m.

The threshold distance when the curvature of a lane in which the host vehicle is located is less than or equal to the second reference curvature value (e.g., about 5000 m) and greater than the third reference curvature value (e.g., about 3000 m) may be greater than the threshold distance when the curvature of the lane is less than or equal to the third reference curvature value (e.g., about 3000 m).

In an eleventh operation 619, the processor of the object recognition apparatus may identify whether the curvature is greater than about 2000 m. When the curvature is greater than about 2000 m, the processor of the object recognition apparatus may perform a twelfth operation 625. If the curvature is less than or equal to about 2000 m, the processor of the object recognition apparatus may perform a thirteenth operation 623.

The processor of the object recognition apparatus may identify whether the curvature of a lane is less than or equal to the third reference curvature value (e.g., about 3000 m) and greater than a fourth reference curvature value (e.g., about 2000 m).

In the twelfth operation 625, the processor of the object recognition apparatus may set the threshold distance to about 50 m.

The threshold distance when the curvature of a lane in which the host vehicle is located is less than or equal to the third reference curvature value (e.g., about 3000 m) and greater than the fourth reference curvature value (e.g., about 2000 m) may be greater than the threshold distance when the curvature of the lane is less than or equal to the fourth reference curvature value (e.g., about 2000 m).

In the thirteenth operation 623, the processor of the object recognition apparatus may identify whether the curvature is greater than about 1000 m. If the curvature is greater than about 1000 m, the processor of the object recognition apparatus may perform a fourteenth operation 629. When the curvature is less than or equal to about 1000 m, the processor of the object recognition apparatus may perform a fifteenth operation 627.

The processor of the object recognition apparatus may identify whether the curvature of a lane is less than or equal to the fourth reference curvature value (e.g., about 2000 m) and greater than a fifth reference curvature value (e.g., about 1000 m).

In the fourteenth operation 629, the processor of the object recognition apparatus may set the threshold distance to about 40 m.

The threshold distance when the curvature of a lane in which the host vehicle is located is less than or equal to the fourth reference curvature value (e.g., about 2000 m) and greater than the fifth reference curvature value (e.g., about 1000 m) may be greater than the threshold distance when the curvature of the lane is less than or equal to the fifth reference curvature value (e.g., about 1000 m).

In the fifteenth operation 627, the processor of the object recognition apparatus may identify whether the curvature is greater than about 500 m. If the curvature is greater than about 500 m, the processor of the object recognition apparatus may perform the fourth operation 609. If the curvature is less than or equal to about 500 m, the processor of the object recognition apparatus may perform the second operation 605.

According to an embodiment, the processor of the object recognition apparatus may identify whether the curvature (e.g., the radius of curvature) of a lane is less than or equal to the fifth reference curvature value (e.g., about 1000 m) and greater than a sixth reference curvature value (e.g., about 500 m).

The processor of the object recognition apparatus may set the threshold distance to about 30 m when the curvature is less than or equal to the fifth reference curvature value (e.g., about 1000 m) and is greater than the sixth reference curvature value (e.g., about 500 m). The processor of the object recognition apparatus may set the threshold distance to about 20 m when the curvature is less than or equal to the sixth reference curvature value (e.g., about 500 m).

The threshold distance when the curvature of a lane in which the host vehicle is located is less than or equal to the fifth reference curvature value (e.g., about 1000 m) and greater than the sixth reference curvature value (e.g., about 500 m) may be greater than the threshold distance when the curvature of the lane is less than or equal to the sixth reference curvature value (e.g., about 500 m).

Figure 7:
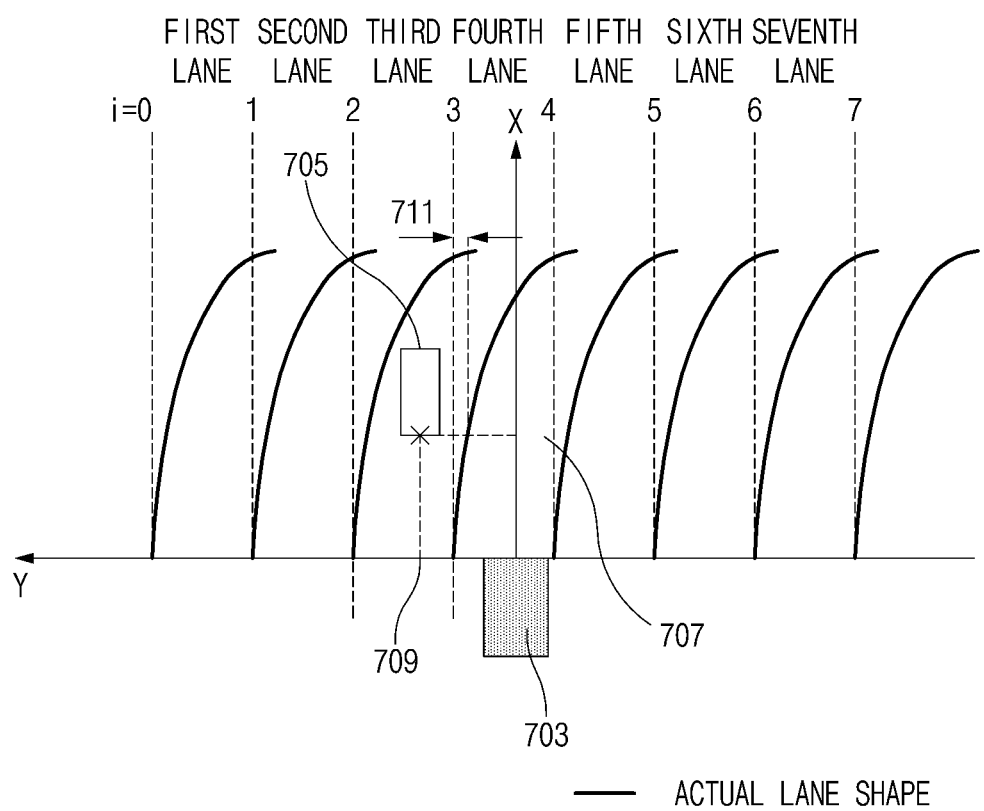
FIG. 7 shows an example of lane information where an object is located in an object recognition apparatus or an object recognition method.

FIG. 7 shows an example of lane information where an object is located in an object recognition apparatus or an object recognition method.

Referring to FIG. 7, a frame 701 may represent a host vehicle 703 and an object 705. A longitudinal distance position 707 may indicate the position of a point corresponding to the object 705 in a line direction. X may represent an x-axis coordinate value corresponding to the longitudinal distance position. A lateral distance position 709 may indicate the position of the point corresponding to the object 705 in a direction perpendicular to the line direction. Y may represent a y-axis coordinate value corresponding to the lateral distance position. A point corresponding to the object 705 may include a center point of the rearmost line segment in the moving direction of the object 705 among line segments constituting an object box including contour points representing the object 705. The center point may be referred to as a tracking point, but may not be limited thereto. A difference value 711 may represent the lateral distance position of a line corresponding to the longitudinal distance position of the object 705.

The processor of the object recognition apparatus may identify the positions of lines based on at least one of longitudinal distance position, curvature information, the width of a specified lane, or the number of specified lanes, or any combination thereof.

For example, when using the host vehicle 703 as the origin, position information of lines from the host vehicle 703 may be calculated as shown in Equation 1. "i" may include an integer from 0 to the number of specified lanes. "w" may denote the width of a specified lane (e.g., about 3.5 m, or about 3.7 m). "N" may denote the number of specified lanes. Hereinafter, a value of "N/2" may be the quotient obtained by dividing "N" by 2, with the decimal point truncated. The i-th line may refer to a line identified on the right side of the i-th lane, but may not be limited to this.

$$\text{Position of } i\text{-th line} = \left(W * \left(\frac{N}{2} - i\right)\right) + \frac{W}{2} \quad \text{[Equation 1]}$$

According to an example, the number of specified lanes may include the number of lanes in which the host vehicle is located. For example, when the number of specified lanes is seven, the processor of the object recognition apparatus may identify 3 lanes on each of both sides of the host vehicle. When three lanes are specified to be identified on each of both sides of the host vehicle, and the width of the lane is specified to be approximately 3.5 m, the positions of the lines may be as shown in Table 1 below.

TABLE 1

| i | 0 | 1 | 2 | 3 | 4 | 5 | 6 | 7 |
|---|---|---|---|---|---|---|---|---|
| i-th lane | 12.25 m | 8.75 m | 5.25 m | 1.75 m | −1.75 m | −5.25 m | −8.75 m | −12.25 m |

According to an example, the lateral position of a line corresponding to the longitudinal position 707 in which the object 705 is located may include a value obtained by adding the difference value 711 to the position of the line on the Y axis (e.g., the position of (i-th)-line calculated in Equation 1). The difference value 711 may be calculated as in Equation 2. The "c" value may denote the curvature value of a lane in which the host vehicle is located. "x" may denote the longitudinal distance position 707 of the object 705. "a" may refer to a smoothing factor.

$$\text{Difference } vlaue = c \pm \sqrt{c^2 - a*x^2} \quad \text{[Equation 2]}$$

According to an example, the processor of the object recognition apparatus may identify the lateral position of the line corresponding to the longitudinal position 707 of the object 705.

If the lateral position 709 of the object 705 is identified between the lateral position of the n-th line corresponding to the longitudinal position 707 of the object 705 and the lateral position of the (n+1)-th line corresponding to the longitudinal position 707, the processor of the object recognition apparatus may identify the object 705 as being located in a lane between the n-th line and the (n+1)-th line. For example, because the lateral position 709 of the object 705 is identified between the second line and third line in the frame 701, the processor of the object recognition apparatus may identify that the object 705 is located in the third lane between the second line and the third line.

Through this process, the processor of the object recognition apparatus may obtain lane information about a lane in which an object is located.

Figure 8:
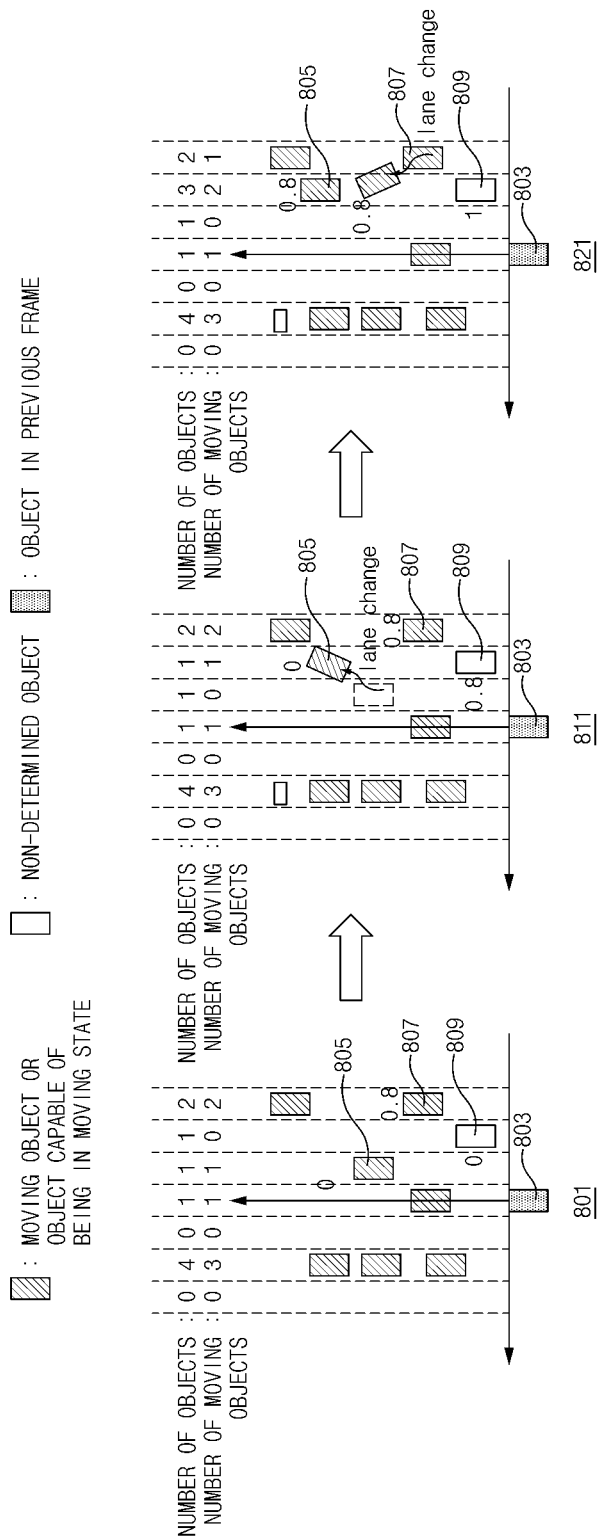
FIG. 8 shows an example of a change in a reliability value according to information that changes when a host vehicle changes a lane in an object recognition apparatus or an object recognition method.

FIG. 8 shows an example of a change in a reliability value according to information that changes when a host vehicle changes a lane in an object recognition apparatus or an object recognition method.

Referring to FIG. 8, a first frame 801, a second frame 811, and a third frame 821 may include objects around a host vehicle 803 which are identified based on contour points obtained through a LIDAR. The processor of an object recognition apparatus may acquire the frame 801, the frame 811, and the frame 821 in the order thereof.

In the frame 801, a first object 805 and a second object 807 may be a moving object or an object capable of being in a moving state. In the frame 801, a third object 809 may be an object that has not yet been determined whether the object is a moving object, an object capable of being in a moving state or an object incapable of being in a moving state.

If there is no other object identified as a moving object or an object capable of being in a moving state in a lane in which an object is located, the reliability value according to other in-lane-object information may include 0. If there is another object identified as a moving object or an object capable of being in a moving state in a lane in which an object is located, the reliability value according to other in-lane-object information may include 0.8. If there are two or more other objects identified as moving objects or objects capable of being in a moving state in a lane in which an object is located, the reliability value according to other in-lane-object information may include 1.

A reliability value according to other in-lane-object information of the first object 805 of the first frame 801 may be 0, a reliability value according to other in-lane-object information of the second object 807 of the first frame 801 may be 0.8, and a reliability value according to other in-lane-object information of the third object 809 of the first frame 801 may be 0.

In the frame 811, the first object 805 may change lanes from a fifth lane to a sixth lane. Despite a change in the lane of the first object 805, the reliability value according to other in-lane-object information of the first object 805 in the frame 811 may be maintained at 0. Despite a change in the lane of the first object 805, the reliability value according to other in-lane-object information of the second object 807 in the frame 811 may be maintained at 0.8. As the first object 805 changes lanes, the reliability value according to other in-lane-object information of the third object 809 in the frame 811 may change from 0 to 0.8.

Even when the first object 805 in frame 811 moves into the lane in which the third object 809 is located, which is before the first object 805 is identified as a moving object or an object capable of being in a moving state, the processor of the object recognition apparatus may maintain a reliability value according to other in-lane-object information of the first object 805 in frame 811 to be zero. This is because there is no moving object or object capable of being in a moving state in the sixth lane in which the first object 805 is located in the frame 811.

If the third object 809 in the frame 811 is a moving object or an object capable of being in a moving state, a reliability value of the first object 805 in the frame 811 may be changed from 0 to 0.8 according to the change in the lane of the first object 805.

In the frame 821, the second object 807 may change the lane from the seventh lane to the sixth lane. As the second object 807 changes lanes, the reliability value according to other in-lane-object information of the first object 805 in the frame 821 may change from 0 to 0.8. This is because the second object 807 of the frame 821, which is a moving object or an object capable of being in a moving state is identified within the same lane. Despite a change in the lane of the second object 807, the reliability value according to other in-lane-object information of the second object 807 in the frame 821 may be maintained at 0.8. As the second object 807 changes lanes, the reliability value according to other in-lane-object information of the third object 809 in the frame 821 may change from 0.8 to 1. This is because the number of moving objects or objects capable of being in a moving state within the sixth lane has increased to two.

Figure 9:
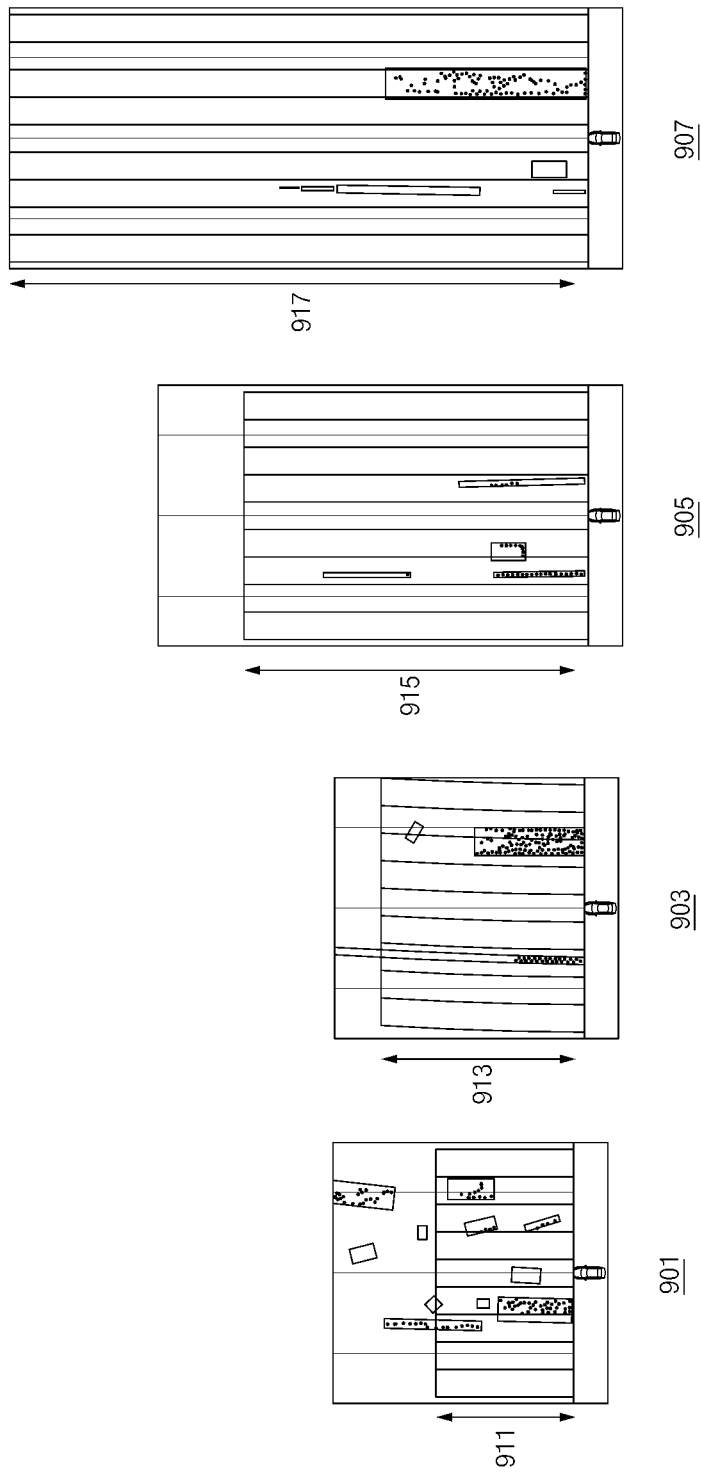
FIG. 9 shows an example of a threshold distance that changes according to the speed of a host vehicle and curvature information in an object recognition apparatus or an object recognition method.

FIG. 9 shows an example of a threshold distance that changes according to the speed of a host vehicle and curvature information in an object recognition apparatus or an object recognition method.

Referring to FIG. 9, the threshold distance may be determined according to at least one of speed information of the host vehicle, or curvature information of a lane in which the host vehicle is located, or any combination thereof. According to an example, a reliability value according to other in-lane-object information of the present disclosure may be assigned to an object within the threshold distance.

At frame 901, the processor of the object recognition apparatus may identify a first threshold distance value (e.g., about 20 m) as a first threshold distance 911 of a host vehicle based on a speed of the host vehicle which is less than a reference speed (e.g., about 10 kph).

At frame 903, the processor of the object recognition apparatus may identify a second threshold distance value (e.g., about 30 m) as a second threshold distance 913 of the host vehicle based on the speed of the host vehicle greater than or equal to the reference speed (e.g., about 10 kph) and the curvature of a lane in which the host vehicle is located, which is greater than a first reference curvature (e.g., about 500 m) and less than a second reference curvature (e.g., about 1000 m).

At frame 905, the processor of the object recognition apparatus may identify a third threshold distance value (e.g., about 50 m) as a third threshold distance 915 of the host vehicle based on the speed of the host vehicle greater than or equal to the reference speed (e.g., about 10 kph) and the curvature of a lane in which the host vehicle is located, which is greater than a third reference curvature (e.g., about 2000 m) exceeding the second reference curvature (e.g., about 1000 m) and less than a fourth reference curvature (e.g., about 3000 m).

At frame 907, the processor of the object recognition apparatus may identify a fourth threshold distance value (e.g., about 80 m) as a fourth threshold distance 917 of the host vehicle based on the speed of the host vehicle greater than or equal to the reference speed (e.g., about 10 kph) and the curvature of a lane in which the host vehicle is located, which is greater than a fifth reference curvature (e.g., about 10000 m) exceeding the fourth reference curvature (e.g., about 3000 m).

Figure 10:
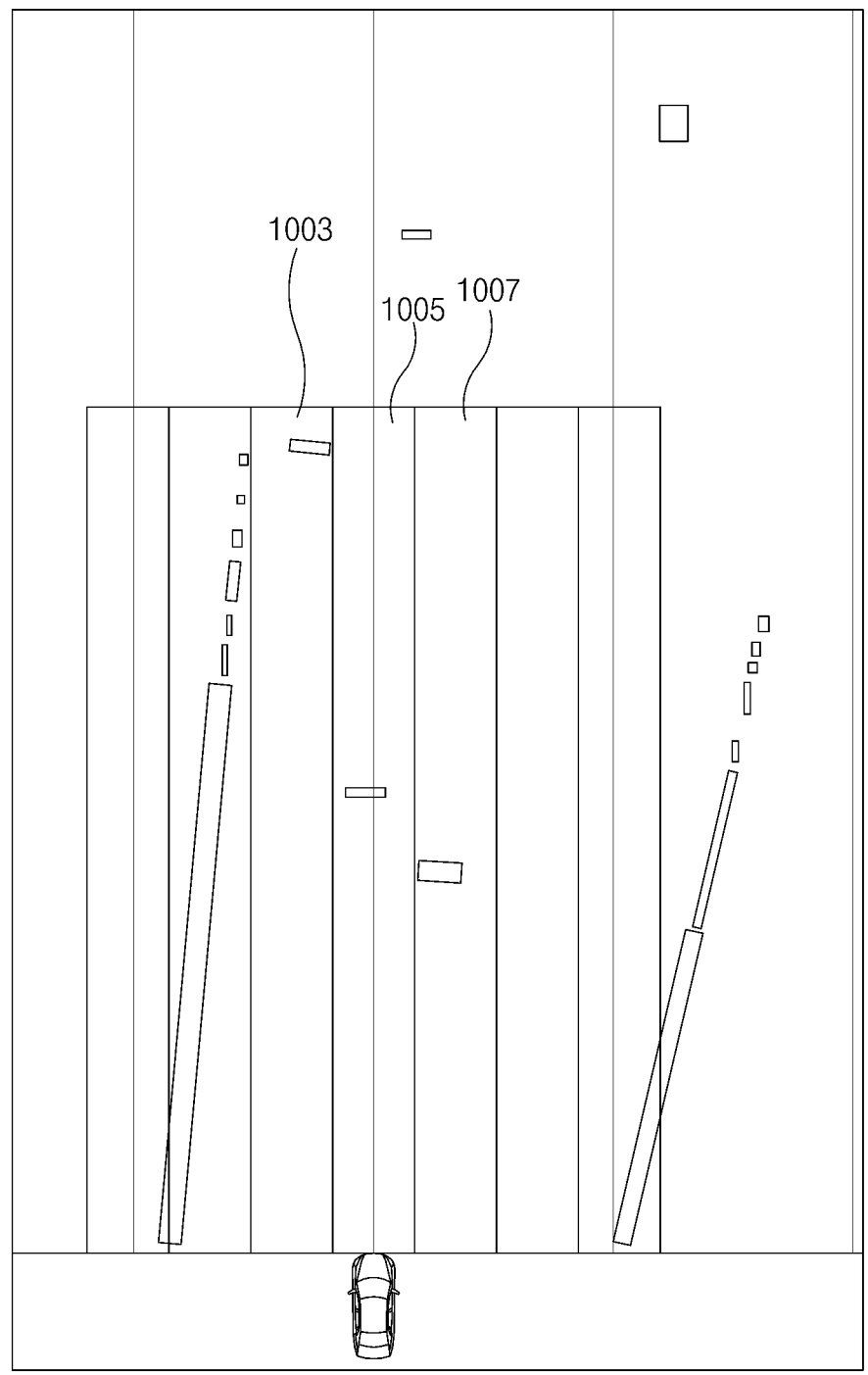
FIG. 10 shows an example of an object whose reliability is identified within a threshold distance in an object recognition apparatus or an object recognition method.

FIG. 10 shows an example of an object whose reliability is identified within a threshold distance in an object recognition apparatus or an object recognition method.

Referring to FIG. 10, in frame 1001, a third lane 1003, a fourth lane 1005, and a fifth lane 1007 may represent lanes identified within a threshold distance with respect to the host vehicle.

When a lane is curved or the lane of the host vehicle is changed as in the lane shown in frame 1001, lane information may be inaccurate. Errors in lane information may cause errors in reliability according to other in-lane-object information. According to an example, to reduce errors in object classification due to errors in reliability, the processor of the object recognition apparatus may assign reliability according to other in-lane-object information only to objects included within a threshold distance. Object classification may include identifying whether an object is a moving object, an object capable of being in a moving state, or an object incapable of being in a moving state.

According to an example, even when a lane is curved or the lane of the host vehicle is changed, as in the lane shown in frame 1001, the lane information of an object within the threshold distance may have an accuracy of a reference value or more.

Figure 11:
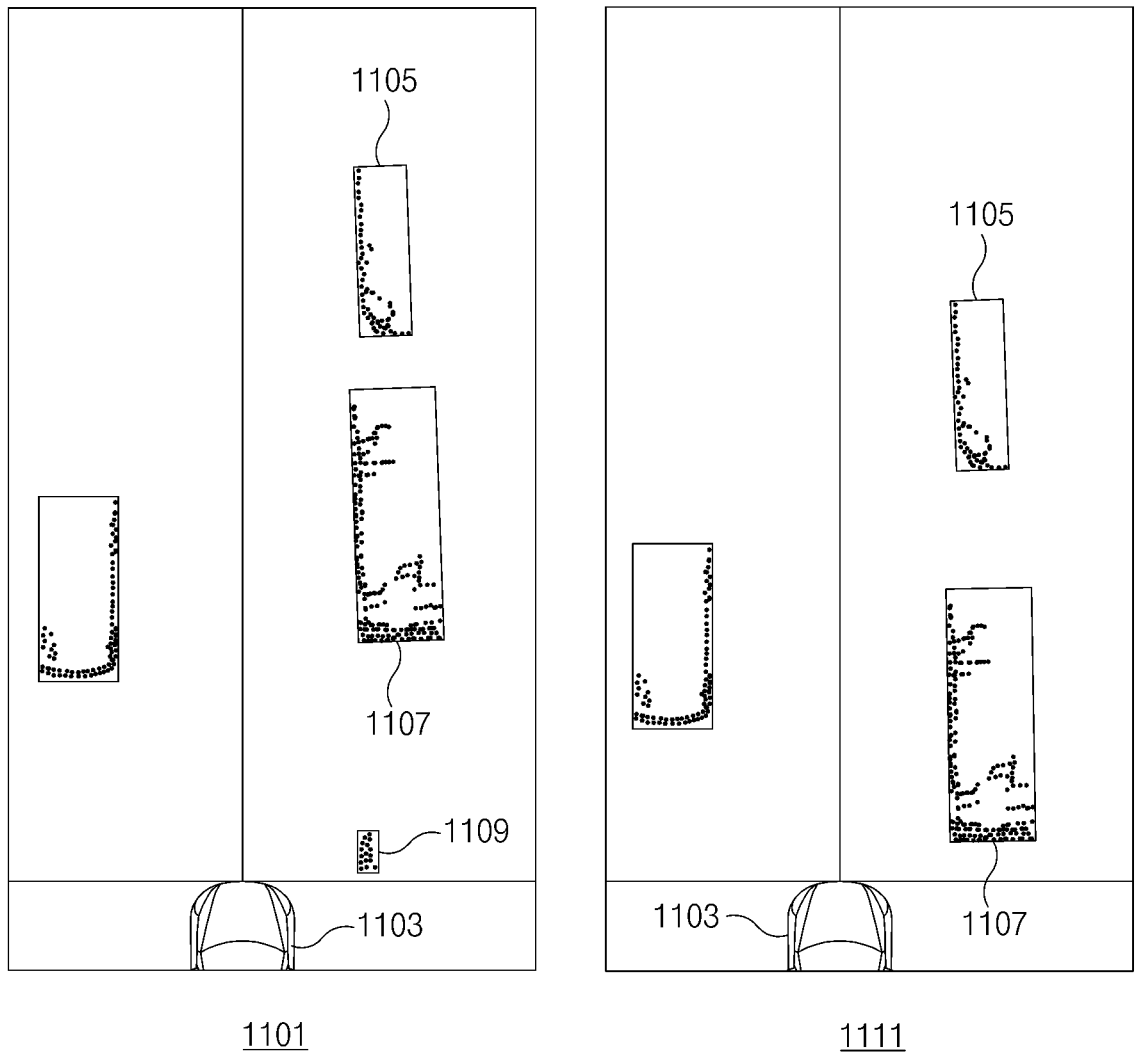
FIG. 11 shows an example of a change in a reliability value according to information that changes depending on the positions of other objects in an object recognition apparatus or an object recognition method.

FIG. 11 shows an example of a change in a reliability value according to information that changes depending on the positions of other objects in an object recognition apparatus or an object recognition method.

Referring to FIG. 11, the processor of the object recognition apparatus may acquire frames in the order of a first frame 1101 and a second frame 1111. The first frame 1101 may include a host vehicle 1103, a first object 1105, a second object 1107, and a third object 1109. The second frame 1111 may include the host vehicle 1103, the first object 1105, and the second object 1107.

The first object 1105 of the first frame 1101 may be before the first object 1105 is identified to be a moving object or an object capable of being in a moving state. The second object 1107 of the first frame 1101 and the third object 1109 of the first frame 1101 may be identified as a moving object or an object capable of being in a moving state.

According to an example, in the first frame 1101, the reliability value of the first object 1105 according to the other in-lane-object information may be identified as 1 due to other objects (e.g., the second object 1107 of the first frame 1101 and the third object 1109 of the first frame 1101) identified as a moving object or an object capable of being in a moving state within the same lane.

According to an example, in the second frame 1111, the third object 1109 identified in the first frame 1101 may not be identified in the lane in which the first object 1105 of the second frame 1111 is located as the host vehicle moves. The reliability value according to the information on other objects in a lane in which the first object 1105 of the second frame 1111 is located may be identified as 0.8 due to another object (e.g., the second object 1107 of the second frame 1111) identified as a moving object or an object capable of being in a moving state within the same lane.

The reliability value according to information on other objects in the lane may be changed as the host vehicle moves or the lane is changed.

Figure 12:
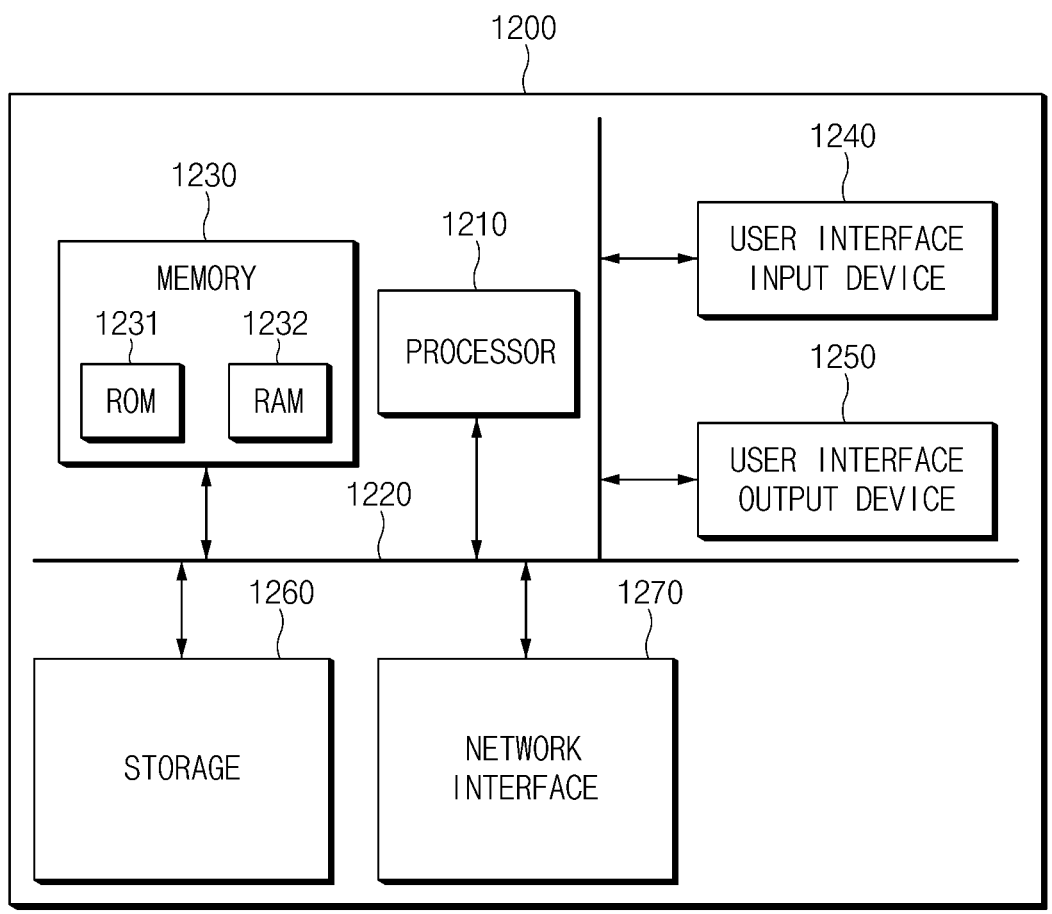
FIG. 12 shows a computing system related to an object recognition apparatus or an object recognition method.

FIG. 12 shows a computing system related to an object recognition apparatus or an object recognition method.

According to an aspect of the present disclosure, an object recognition apparatus includes a LIDAR and a processor.

According to an example, the processor may identify longitudinal position information representing a distance in a line direction from a host vehicle to an object, and lateral position information representing a distance in a direction perpendicular to the line direction from the host vehicle to the object through the LIDAR, identify lane information representing a lane in which the object is located according to at least one of the lateral position information, or positions of lines located on both sides of the host vehicle, or any combination thereof based on identifying that the longitudinal position information falls within a range according to a threshold distance, identify whether at least one other object, which is different from the object and which is identified as a moving object or an object capable of being in a moving state, is located within the lane in which the object is located, assign a first value as a reliability value of the object when the at least one other object is located within the lane in which the object is located, assign a second value smaller than the first value as the reliability value when the at least one other object is not located within the lane in which the object is located, and identify the object as a moving object or as an object capable of being in a moving state based on the reliability value.

According to an example, the processor may identify curvature information indicating a curvature of a lane in which the host vehicle is located. The positions of the lines may be identified based on at least one of the longitudinal position information, the curvature information, a width of a specified lane, or a number of specified lanes, or any combination thereof.

According to an example, the processor may identify, based on the lateral position information, that the object is located between a position of a first line and a position of a second line that is next to the first line. The lane information may include a lane located between the first line and the second line.

According to an example, a threshold distance of longitudinal position information identified by the host vehicle driving at a first speed may be smaller than a threshold distance of longitudinal position information identified by the host vehicle driving at a second speed faster than the first speed.

According to an example, a threshold distance of longitudinal position information identified by the host vehicle driving on a lane with a first curvature may be smaller than a threshold distance of longitudinal position information identified by the host vehicle driving on a lane with a second curvature greater than a first curvature.

According to an example, the processor may identify curvature information indicating a curvature of the lane in which the host vehicle is located and identify the longitudinal position information and the lateral position information based on identifying that the curvature information is greater than a specified curvature value.

According to an example, the processor may assign a third value as the reliability value when a first number of other objects identified as moving objects or objects capable of being in a moving state are identified within the lane in which the object is located, and assign a fourth value greater than the third value as the reliability value when a second number of other objects greater than the first number are identified within the lane in which the object is located.

According to an example, the processor may change the reliability value from the second value to the first value when the lane information of the object changes due to the object moving from a first lane in which the other object is not located to a second lane in which the other object is located.

According to an example, the processor may maintain the reliability value even when at least one other object moves into the lane in which the object is located before the object is identified as a moving object or before the object is identified as an object capable of being in a moving state.

According to an example, the processor may assign, to the object, an identifier indicating that the object is a moving object or an object capable of being in a moving state, based on identifying that a score value representing a probability that the object identified based on the reliability value is a moving object or an object capable of being in a moving state is greater than a score value representing a probability that the object is an object incapable of being in a moving state.

According to an aspect of the present disclosure, an object recognition method includes identifying longitudinal position information representing a distance in a line direction from a host vehicle to an object and lateral position information representing a distance in a direction perpendicular to the line direction from the host vehicle to the object through the LIDAR, identifying lane information representing a lane in which the object is located according to at least one of the lateral position information, or positions of lines located on both sides of the host vehicle or any combination thereof based on identifying that the longitudinal position information falls within a range according to a threshold distance, identifying whether at least one other object, which is different from the object and which is identified as a moving object or an object capable of being in a moving state, is located within the lane in which the object is located, assigning a first value as a reliability value of the object when the at least one other object is located within the lane in which the object is located, assigning a second value smaller than the first value as the reliability value when the at least one other object is not located within the lane in which the object is located, and identifying the object as a moving object or as an object capable of being in a moving state based on the reliability value.

According to an example, the object recognition method may further include identifying curvature information indicating a curvature of the lane in which the host vehicle is located. The positions of the lines may be identified based on at least one of the longitudinal position information, the curvature information, a width of a specified lane, or a number of specified lanes, or any combination thereof.

According to an example, the identifying of whether at least one other object, which is different from the object and which is identified as a moving object or an object capable of being in a moving state, is located within the lane in which the object is located may include identifying, based on the lateral position information, that the object is located between a position of a first line and a position of a second line that is next to the first line. The lane information may include a lane located between the first line and the second line.

According to an example, a threshold distance of longitudinal position information identified by the host vehicle driving at a first speed may be smaller than a threshold distance of longitudinal position information identified by the host vehicle driving at a second speed faster than the first speed.

According to an example, a threshold distance of longitudinal position information identified by the host vehicle driving on a lane with a first curvature may be smaller than a threshold distance of longitudinal position information identified by the host vehicle driving on a lane with a second curvature greater than a first curvature.

According to an example, the object recognition method may further include identifying curvature information indicating a curvature of the lane in which the host vehicle is located, and identifying the longitudinal position information and the lateral position information based on identifying that the curvature information is greater than a specified curvature value.

According to an example, the object recognition method may further include assigning a third value as the reliability value when a first number of other objects identified as moving objects or objects capable of being in a moving state are identified within the lane in which the object is located, and assigning a fourth value greater than the third value as the reliability value when a second number of other objects greater than the first number are identified within the lane in which the object is located.

According to an example, the object recognition method may further include changing the reliability value from the second value to the first value when the lane information of the object changes due to the object moving from a first lane in which the other object is not located to a second lane in which the other object is located.

According to an example, the object recognition method may further include maintaining the reliability value even when at least one other object moves into the lane in which the object is located before the object is identified as a moving object or before the object is identified as an object capable of being in a moving state.

According to an example, the object recognition method may further include assigning, to the object, an identifier indicating that the object is a moving object or an object capable of being in a moving state, based on identifying that a score value representing a probability that the object identified based on the reliability value is a moving object or an object capable of being in a moving state is greater than a score value representing a probability that the object is an object incapable of being in a moving state.

Referring to FIG. 12, a computing system 1200 may include at least one processor 1210, a memory 1230, a user interface input device 1240, a user interface output device 1250, storage 1260, and a network interface 1270, which are connected with each other via a bus 1220.

The processor 1210 may be a central processing unit (CPU) or a semiconductor device that processes instructions stored in the memory 1230 and/or the storage 1260. The memory 1230 and the storage 1260 may include various types of volatile or non-volatile storage media. For example, the memory 1230 may include a ROM (Read Only Memory) 1231 and a RAM (Random Access Memory) 1232.

Thus, the operations of the method or the algorithm described in connection with the features disclosed herein may be embodied directly in hardware or a software module executed by the processor 1210, or in a combination thereof. The software module may reside on a storage medium (that is, the memory 1230 and/or the storage 1260) such as a RAM, a flash memory, a ROM, an EPROM, an EEPROM, a register, a hard disk, a removable disk, and a CD-ROM.

The exemplary storage medium may be coupled to the processor 1210, and the processor 1210 may read information out of the storage medium and may record information in the storage medium. Alternatively, the storage medium may be integrated with the processor 1210. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The present technology may increase the accuracy of determination of identifying whether an object is a moving object or an object capable of being in a moving state by using at least one other object in the same lane as the object.

Further, the present technology may identify whether an object having a part occluded is a moving object or an object capable of being in a moving state by using at least one other object in the same lane as the object.

Further, the present technology may identify whether an object being in a stationary state is a moving object or an object capable of being in a moving state by using at least one other object in the same lane as the object.

Further, the present technology may enhance user experience by improving the accuracy of determination of identifying whether an object is a moving object or an object capable of being in a moving state.

Further, the present technology may improve performance of autonomous driving by improving the accuracy of determination of identifying whether an object is a moving object or an object capable of being in a moving state.

In addition, various effects may be provided that are directly or indirectly understood through the disclosure.

Hereinabove, although the present disclosure has been described with reference to various examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:
a sensor; and
a processor,
wherein the processor is configured to:
determine, based on sensing information of the sensor, longitudinal position information representing a distance in a line direction from a vehicle to an object and lateral position information representing a distance in a direction perpendicular to the line direction;
determine, based on a determination that the longitudinal position information falls within a range according to a threshold distance, lane information representing a lane in which the object is located, wherein the lane information is determined based on at least one of: the lateral position information or positions of lines located on both sides of the vehicle;
determine whether at least one other object, which is different from the object and which is identified as a moving object or a stationary object, is located within the lane in which the object is located;
assign a reliability value to the object, wherein a first value corresponds to the reliability value for the object based on the at least one other object being located within the lane in which the object is located, or a second value smaller than the first value corresponds to the reliability value for the object based on the at least one other object not being located within the lane in which the object is located;
determine, based on the reliability value, the object as a moving object or as a stationary object; and
output a signal indicating that the object is a moving object or a signal indicating that the object is a stationary object.

2. The apparatus of claim 1, wherein the processor is configured to:
identify curvature information indicating a curvature of a lane in which the vehicle is located, and
identify the positions of the lines based on at least one of: the longitudinal position information, the curvature information, a width of a specified lane, or a number of specified lanes.

3. The apparatus of claim 1, wherein the processor is configured to identify, based on the lateral position information, that the object is located between a position of a first line and a position of a second line that is next to the first line, and
wherein the lane information is configured to indicate a lane located between the first line and the second line.

4. The apparatus of claim 1, wherein a threshold distance of longitudinal position information identified by the vehicle driving at a first speed is configured to be smaller than a threshold distance of longitudinal position information identified by the vehicle driving at a second speed faster than the first speed.

5. The apparatus of claim 1, wherein a threshold distance of longitudinal position information identified by the vehicle driving on a lane with a first curvature is configured to be smaller than a threshold distance of longitudinal position information identified by the vehicle driving on a lane with a second curvature greater than a first curvature.

6. The apparatus of claim 1, wherein the processor is configured to:
determine curvature information indicating a curvature of a lane in which the vehicle is located; and
determine the longitudinal position information and the lateral position information based on the curvature information being greater than a specified curvature value.

7. The apparatus of claim 1, wherein:
a third value corresponds to the reliability value for the object when a first number of other objects identified as moving objects or objects capable of being in a moving state are identified within the lane in which the object is located; and
a fourth value greater than the third value corresponds to the reliability value for the object when a second number of other objects greater than the first number are identified within the lane in which the object is located.

8. The apparatus of claim 1, wherein the processor is configured to change the reliability value from the second value to the first value based on the lane information of the object being changed due to the object moving from a first lane in which an other object is not located to a second lane in which the other object is located.

9. The apparatus of claim 1, wherein the processor is configured to maintain the reliability value even when at least one other object moves into the lane in which the object is located before the object is identified as a moving object or before the object is identified as a stationary object.

10. The apparatus of claim 1, wherein the processor is configured to assign, to the object, an identifier indicating that the object is a moving object or a stationary object capable of being in a moving state, based on a determination that a score value representing a probability that the object identified based on the reliability value is a moving object or a stationary object capable of being in a moving state is greater than a score value representing a probability that the object is a stationary object incapable of being in a moving state.

11. A method comprising:
determining, by a processor and based on sensing information of a sensor, longitudinal position information representing a distance in a line direction from a vehicle to an object and lateral position information representing a distance in a direction perpendicular to the line direction;
determining, based on a determination that the longitudinal position information falls within a range according to a threshold distance, lane information representing a lane in which the object is located, wherein the lane information is determined based on at least one of: the lateral position information or positions of lines located on both sides of the vehicle;
determining whether at least one other object, which is different from the object and which is identified as a moving object or a stationary object, is located within the lane in which the object is located;
assigning a reliability value to the object, wherein a first value corresponds to the reliability value for the object based on the at least one other object being located within the lane in which the object is located, or a second value smaller than the first value corresponds to the reliability value for the object based on the at least one other object not being located within the lane in which the object is located;
determining, based on the reliability value, the object as a moving object or as a stationary object; and
outputting a signal indicating that the object is a moving object or a signal indicating that the object is a stationary object.

12. The method of claim 11, further comprising:
identifying curvature information indicating a curvature of the lane in which the vehicle is located; and
identifying the positions of the lines based on at least one of: the longitudinal position information, the curvature information, a width of a specified lane, or a number of specified lanes.

13. The method of claim 11, wherein the determining of whether at least one other object is located within the lane in which the object is located comprises:
determining, based on the lateral position information, that the object is located between a position of a first line and a position of a second line that is next to the first line,
wherein the lane information is configured to indicate a lane located between the first line and the second line.

14. The method of claim 11, wherein a threshold distance of longitudinal position information identified by the vehicle driving at a first speed is configured to be smaller than a threshold distance of longitudinal position information identified by the vehicle driving at a second speed faster than the first speed.

15. The method of claim 11, wherein a threshold distance of longitudinal position information identified by the vehicle driving on a lane with a first curvature is configured to be smaller than a threshold distance of longitudinal position information identified by the vehicle driving on a lane with a second curvature greater than a first curvature.

16. The method of claim 11, further comprising:
determining curvature information indicating a curvature of a lane in which the vehicle is located; and
determining the longitudinal position information and the lateral position information based on the curvature information being greater than a specified curvature value.

17. The method of claim 11, wherein:
a third value corresponds to the reliability value for the object when a first number of other objects identified as moving objects or objects capable of being in a moving state are identified within the lane in which the object is located; and
a fourth value greater than the third value corresponds to the reliability value for the object when a second number of other objects greater than the first number are identified within the lane in which the object is located.

18. The method of claim 11, further comprising:
changing the reliability value from the second value to the first value based on the lane information of the object being changed due to the object moving from a first lane in which an other object is not located to a second lane in which the other object is located.

19. The method of claim 11, further comprising:
maintaining the reliability value even when at least one other object moves into the lane in which the object is located before the object is identified as a moving object or before the object is identified as a stationary object.

20. The method of claim 11, further comprising:
assigning, to the object, an identifier indicating that the object is a moving object or a stationary object capable of being in a moving state, based on a determination that a score value representing a probability that the object identified based on the reliability value is a moving object or a stationary object capable of being in a moving state is greater than a score value representing a probability that the object is a stationary object incapable of being in a moving state.

* * * * *